United States Patent Office 3,157,602
Patented Nov. 17, 1964

3,157,602
PROCESS FOR PREPARING PYROSILICATE PHOSPHORS
Richard C. Ropp, Towanda, Pa., assignor to Sylvania Electric Products Inc., a corporation of Delaware
No Drawing. Filed Dec. 28, 1961, Ser. No. 162,993
2 Claims. (Cl. 252—301.6)

This invention relates to phosphors which may be excited by ultraviolet radiation, cathode rays, X-rays and the like. More particularly, this invention concerns an improved process for preparing lead-activated phosphors having a tetragonal crystal structure of the class $M_2NSi_2O_7$ where M may be at least one alkaline earth metal and N may be magnesium, zinc and/or cadmium.

The preparation of luminescent pyrosilicate materials of the above described class has been heretofore known and methods have been devised for their preparation. Particularly, such materials are commonly prepared in a two step firing process in which most all materials necessary for forming the phosphor are mixed together before the first firing step and then heated. After the heating, the product is cooled, milled to break up agglomerates and then refired to produce the phosphor. I have now discovered that the production of efficient luminescent properties in these materials requires the adherence to certain specific procedural steps. Although it is known to add chloride and fluoride fluxes to the phosphor starting materials, I have discovered that such additions are beneficial only if particular process steps are followed. Specifically, I have discovered that with these lead-activated silicates, a fluoride flux must be intermixed with the starting materials before the first firing and a mixture of fluoride and chloride fluxes must be admixed with the product of the first firing before the second firing. Only this combination of fluxes and firings results in an improved phosphor.

In the preparation of these materials, a flux must be added to cause formation of the phosphor within reasonable durations of firing and firing temperatures. Failure to add fluxes necessitates firing at elevated temperatures over an extended duration, thus causing volatilization of the lead activator, and resulting in an inert material.

The starting materials generally used to prepare the phosphor are those conventionally used in the art. A starting material mixture may be formulated containing compounds of alkaline earth metals and compounds of cadmium, magnesium, and/or zinc together with compounds of silicon which when heated, together with a source of an activator, will react to form the phosphor represented by the formula $M_2NSi_2O_7:Pb$, where M can be barium, calcium, and/or strontium and N can be magnesium, cadmium and/or zinc. As sources of these anions and cations, it is conventional to employ the oxides or such other materials which upon heating break down to form the oxides. Similarly, various compounds may be employed as source of the activator, for example lead oxide, which will be in the phosphor in the plumbus state. As sources of the fluoride and chloride flux, I prefer to employ the alkaline earth fluorides and chlorides; however good resutls may be also obtained with ammonium fluorides and chlorides. Also chlorides and fluorides of magnesium, cadmium and zinc, as well as halides of aluminum and lead may be used.

Specific quantities of fluoride fluxes to be added to the phosphor-forming materials before the first firing may vary and depend upon conditions such as the proposed firing temperature and duration of firing. I have found that between about 0.01 mole to about .30 mole of fluoride per mole of pyrosilicate (calculated as the compound) must be added before the first firing. If quantities of fluoride greater than this range are added, too much silicate will be volatilized thus materially degrading the luminescent efficiency of the phosphor, while if too little flux is added, the beneficial effects of my invention will not be realized.

The conditions of firing the material may be those conventional in the art, for example, the first firing may be conducted in air at a temperature within the range of 1200 to 1900° F. for 2 to 12 hours and the second firing may be conducted in an atmosphere of an air-steam mixture at temperatures of 1200 to 1900° F. for 2 to 12 hours. I prefer however, to prepare the phosphor by firing the materials the first time at 1600° F. for 4 hours and the second time at 1800° F. for 6 hours.

As will be seen from the following Table I, the range of fluoride addition is quite important. In this table and in other tables of this specification, the lamp brightnesses are expressed in ultraviolet units and are arbitrary, since ultraviolet light does not stimulate visual response to the human eye. Thus, the ultraviolet units are expressed in terms of stimulation of a photocell calibrated by a standard light source. In Table I the total barium content was kept constant so that only the fluoride content varied and the tests were made using four and six per cent by weight respectively $BaF_2$ and $BaCl_2$ in the second firing.

Table I
EFFECT OF FLUORIDE

| 1st Firing $BaF_2$(mols) | UV Units | | | | |
|---|---|---|---|---|---|
| | 0 Hr. | 100 Hr. | Percent M[1] | 300 Hr. | Percent M[1] |
| .01 | 6,073 | 5,323 | 87.7 | 5,179 | 85.2 |
| .05 | 7,516 | 6,730 | 89.5 | 6,586 | 87.6 |
| .10 | 7,996 | 6,921 | 86.6 | 6,962 | 87.1 |
| .15 | 8,183 | 7,531 | 92.0 | 7,323 | 89.5 |
| .20 | 7,898 | 7,063 | 89.4 | 7,016 | 88.8 |
| .25 | 8,170 | 7,308 | 89.4 | 7,102 | 86.9 |

[1] Percent maintenance.

Concerning the addition of chloride and fluoride to the product of the first firing, prior to the second firing, I have discovered that between about 0.5 to 12% by weight of a chloride flux must be added together with about 0.5 to 10% fluoride flux. If the chloride or fluoride contents are below about 0.5%, the flux will have no effect, while if the chloride or fluoride contents are above 12 and 10% respectively, deleterious results are evidenced in that, for the chloride, the phosphor material becomes dense and sintered and for the fluorides no appreciable luminescence is evidenced due to volatilization of large quantities of silica.

Now as I have stated, the combination of a fluoride and chloride flux must be added to the product of the first firing. In Table II, the effect of $BaCl_2$ upon brightness and maintenance is shown.

Table II
EFFECT OF $BaCl_2$

| 1st Firing | 2nd Firing | UV Units | | | | |
|---|---|---|---|---|---|---|
| | | 0 Hr. | 100 Hr. | Percent M[1] | 300 Hr. | Percent M[1] |
| 0.10 $BaF_2$ | No Addition | 5,463 | 4,851 | 88.7 | 4,481 | 82.1 |
| 0.10 $BaF_2$ | 3.5% $BaCl_2$ | 7,166 | 6,575 | 91.7 | 6,340 | 88.4 |
| 0.10 $BaF_2$ | 5% $BaF_2$ | 6,713 | 5,495 | 81.8 | 4,941 | 73.5 |

[1] Percent maintenance.

It is seen that the $BaCl_2$ addition materially improves maintenance as well as brightness. A slight improvement is seen if fluoride is present rather than absent during the second firing, but such results merely duplicate those already known to the prior art. But the improved results according to my invention are obtained when the combination of fluoride and chloride fluxes are employed during the second firing.

When just a single fluoride is used in the first firing and a single chloride flux is used in the second firing, the improvement in emission and maintenance is not evidenced. As will be seen in Table III following, these superior results are tabulated.

*Table III*

EFFECT OF DOUBLE FLUXES VS. A SINGLE FLUX

| 1st Firing | 2nd Firing | | UV Units | | | | |
|---|---|---|---|---|---|---|---|
| | Percent BaCl$_2$ | Percent BaF$_2$ | 0 Hr. | 100 Hr. | Percent M[1] | 300 Hr. | Percent M[1] |
| 0.10 Mol BaF$_2$ | 6 | ---- | 8,058 | 6,987 | 86.7 | 6,129 | 76.1 |
| 0.10 Mol BaF$_2$ | 6 | 4 | 8,045 | 7,746 | 96.3 | 6,977 | 86.7 |
| 0.15 Mol BaF$_2$ | 6 | ---- | 7,999 | 6,891 | 86.1 | 5,921 | 74.0 |
| 0.15 Mol BaF$_2$ | 6 | 4 | 8,359 | 7,805 | 93.4 | 7,112 | 85.1 |

[1] Percent maintenance.

Without limiting the claims, the following specific examples of my invention are offered to illustrate various methods for forming phosphors of the above described class M$_2$NSiO$_7$:Pb.

EXAMPLE I

In the preferred method, weigh out:

| | Gm. |
|---|---|
| Ba(NO$_3$)$_2$ | 300.2 |
| BaF$_2$ | 26.1 |
| SrCO$_3$ | 75.3 |
| CaCO$_3$ | 5.0 |
| MgCO$_3$ | 94.8 |
| ZnO | 8.1 |
| SiO$_2$ | 137.2 |
| PbO | 3.35 |

Fire 4 hrs. at 1600° F. in air, cool, add 6% BaCl$_2$ and 4% BaF$_2$ by weight of the prefired phosphor as well as 0.01% As$_2$O$_5$ by weight. Blend well and refire in an air-steam atmosphere for 4 hours at 1800° F.

EXAMPLE II

Weigh out:

| | Gm. |
|---|---|
| Ba(NO$_3$)$_2$ | 334.6 |
| BaF$_2$ | 17.5 |
| SrCO$_3$ | 48.7 |
| CaCO$_3$ | 5.0 |
| MgCO$_3$ | 90.8 |
| ZnO | 8.1 |
| SiO$_2$ | 136.6 |
| PbO | 3.35 |

Prefire as before, add 4% BaCl$_2$ and 6% BaF$_2$ by weight, and refire in an air-steam atmosphere.

Although the optimum concentration of 6% BaCl$_2$ by weight and 4% by weight of BaF$_2$ was experimentally determined, equally good results were obtained when the percentages of each relative to each other were changed and when the total weight percent varied. The effect was seen over the concentration range of 0.5% to 12% BaCl$_2$ by weight and 0.5% to 10% by weight of BaF$_2$.

EXAMPLE III

| | Gm. |
|---|---|
| MgCO$_3$ | 181.6 |
| SiO$_2$ | 272.4 |
| PbO | 6.7 |
| CaCO$_3$ | 362.3 |
| CaF$_2$ | 15.6 |

Prefire as before at 1600° F., add 6% of BaCl$_2$ and 6% BaF$_2$ by weight, and refire in an air-steam atmosphere at 1800° F.

EXAMPLE IV

Weigh out:

| | Gm. |
|---|---|
| MgCO$_3$ | 181.6 |
| SiO$_2$ | 272.4 |
| PbO | 6.7 |
| SrCO$_3$ | 534.5 |
| SrF$_2$ | 25.1 |

Prefire as before at 1600° F., add 2% of BaCl$_2$ and 4% BaF$_2$ by weight, and refire in an air-steam atmosphere at 1800° F.

EXAMPLE V

Weigh out:

| | Gm. |
|---|---|
| MgCO$_3$ | 181.6 |
| SiO$_2$ | 272.4 |
| PbO | 6.7 |
| Ba(NO$_3$)$_2$ | 946.2 |
| BaF$_2$ | 35.1 |

Prefire as before at 1600° F., add 3% of BaCl$_2$ and 5% BaF$_2$ by weight, and refire in an air-steam atmosphere at 1800° F.

EXAMPLE VI

Weigh out:

| | Gm. |
|---|---|
| MgCO$_3$ | 181.6 |
| SiO$_2$ | 272.4 |
| PbO | 6.7 |
| Ba(NO$_3$)$_2$ | 449.6 |
| SrCO$_3$ | 280.5 |
| BaF$_2$ | 35.1 |

Prefire as before at 1600° F., add 3% of BaCl$_2$ and 6% BaF$_2$ by weight, and refire in an air-steam atmosphere at 1800° F.

EXAMPLE VII

Weigh out:

| | Gm. |
|---|---|
| MgCO$_3$ | 181.6 |
| SiO$_2$ | 272.4 |
| PbO | 6.7 |
| Ba(NO$_3$)$_2$ | 449.6 |
| CaCO$_3$ | 190.2 |
| BaF$_2$ | 35.1 |

Prefire as before at 1600° F., add 6% of BaCl$_2$ and 4% BaF$_2$ by weight, and refire in an air-steam atmosphere at 1800° F.

EXAMPLE VIII

Weigh out:

| | Gm. |
|---|---|
| MgCO$_3$ | 181.6 |
| SiO$_2$ | 272.4 |
| PbO | 6.7 |
| SrCO$_3$ | 253.9 |
| CaCO$_3$ | 190.2 |
| SrF$_2$ | 25.1 |

Prefire as before at 1600° F., add 3% of BaCl$_2$ and 5% BaF$_2$ by weight, and refire in an air-steam atmosphere at 1800° F.

EXAMPLE IX

Weigh out:

| | Gm. |
|---|---|
| ZnO | 162.8 |
| SiO$_2$ | 272.4 |
| PbO | 6.7 |
| Ba(NO$_3$)$_2$ | 946.2 |
| BaF$_2$ | 35.1 |

Prefire as before at 1600° F., add 2% of BaCl$_2$ and 6% BaF$_2$ by weight, and refire in an air-steam atmosphere at 1800° F.

EXAMPLE X

Weigh out:

| | Gm. |
|---|---|
| ZnO | 162.8 |
| SiO$_2$ | 272.4 |
| PbO | 6.7 |
| SrCO$_3$ | 534.5 |
| SrF$_2$ | 25.1 |

Prefire as before at 1600° F., add 6% of BaCl$_2$ and 4% BaF$_2$ by weight, and refire in an air-steam atmosphere at 1800° F.

EXAMPLE XI

Weigh out:

| | Gm. |
|---|---|
| ZnO | 162.8 |
| SiO$_2$ | 272.4 |
| PbO | 6.7 |
| CaCO$_3$ | 362.3 |
| CaF$_2$ | 15.6 |

Prefire as before at 1600° F., add 4% of BaCl$_2$ and 4% BaF$_2$ by weight, and refire in an air-steam atmosphere at 1800° F.

EXAMPLE XII

Weigh out:

| | Gm. |
|---|---|
| ZnO | 162.8 |
| SiO$_2$ | 272.4 |
| PbO | 6.7 |
| Ba(NO$_3$)$_2$ | 449.6 |
| SrCO$_3$ | 280.5 |
| BaF$_2$ | 35.1 |

Prefire as before at 1600° F., add 6% of BaCl$_2$ and 4% BaF$_2$ by weight, and refire in an air-steam atmosphere at 1800° F.

EXAMPLE XIII

Weigh out:

| | Gm. |
|---|---|
| ZnO | 162.8 |
| SiO$_2$ | 272.4 |
| PbO | 6.7 |
| Ba(NO$_3$)$_2$ | 449.6 |
| CaCO$_3$ | 190.2 |
| BaF$_2$ | 35.1 |

Prefire as before at 1600° F., add 4% of BaCl$_2$ and 6% BaF$_2$ by weight, and refire in an air-steam atmosphere at 1800° F.

EXAMPLE XIV

Weigh out:

| | Gm. |
|---|---|
| ZnO | 162.8 |
| SiO$_2$ | 272.4 |
| PbO | 6.7 |
| SrCO$_3$ | 253.9 |
| CaCO$_3$ | 190.2 |
| SrF$_2$ | 25.1 |

Prefire as before at 1600° F., add 4% of BaCl$_2$ and 4% BaF$_2$ by weight, and refire in an air-steam atmosphere at 1800° F.

EXAMPLE XV

Weigh out:

| | Gm. |
|---|---|
| CdO$_2$ | 292.9 |
| SiO$_2$ | 273.1 |
| PbO | 6.7 |
| Ba(NO$_3$)$_2$ | 946.2 |
| BaF$_2$ | 35.1 |

Prefire as before at 1600° F., add 2% of BaCl$_2$ and 4% BaF$_2$ by weight, and refire in an air-steam atmosphere at 1800° F.

EXAMPLE XVI

Weigh out:

| | Gm. |
|---|---|
| CdO$_2$ | 292.9 |
| SiO$_2$ | 273.1 |
| PbO | 6.7 |
| SrCO$_3$ | 534.5 |
| SrF$_2$ | 25.1 |

Prefire as before, at 1600° F., add 4% of BaCl$_2$ and 4% BaF$_2$ by weight, and refire in an air-steam atmosphere at 1800° F.

EXAMPLE XVII

Weigh out:

| | Gm. |
|---|---|
| CdO$_2$ | 292.9 |
| SiO$_2$ | 273.1 |
| PbO | 6.7 |
| CaCO$_3$ | 362.3 |
| CaF$_2$ | 15.6 |

Prefire as before, at 1600° F., add 4% of BaCl$_2$ and 4% BaF$_2$ by weight, and refire in an air-steam atmosphere at 1800° F.

EXAMPLE XVIII

Weigh out:

| | Gm. |
|---|---|
| CdO$_2$ | 292.9 |
| SiO$_2$ | 273.1 |
| PbO | 6.7 |
| Ba(NO$_3$)$_2$ | 449.6 |
| SrCO$_3$ | 280.5 |
| BaF$_2$ | 35.1 |

Prefire as before at 1600° F., add 2% of BaCl$_2$ and 4% BaF$_2$ by weight, and refire in an air-steam atmosphere at 1800° F.

EXAMPLE XIX

Weigh out:

| | Gm. |
|---|---|
| CdO$_2$ | 292.9 |
| SiO$_2$ | 273.1 |
| PbO | 6.7 |
| Ba(NO$_3$)$_2$ | 449.6 |
| CaCO$_3$ | 190.2 |
| BaF$_2$ | 35.1 |

Prefire as before at 1600° F., add 2% of BaCl$_2$ and 4% BaF$_2$ by weight, and refire in an air-steam atmosphere at 1800° F.

EXAMPLE XX

Weigh out:

| | Gm. |
|---|---|
| CdO$_2$ | 292.9 |
| SiO$_2$ | 273.1 |
| PbO | 6.7 |
| SrCO$_3$ | 253.9 |
| CaCO$_3$ | 190.2 |
| SrF$_2$ | 25.1 |

Prefire as before at 1600° F., add 4% of BaCl$_2$ and 4% BaF$_2$ by weight, and refire in an air-steam atmosphere at 1800° F.

As my invention I claim:

1. In the process of preparing phosphors of the class M$_2$NSi$_2$O$_7$, where M is at least one alkaline earth metal and N is at least one member selected from the group consisting of magnesium, zinc and cadmium, the steps which comprise: mixing together ingredients necessary to form a phosphor of said class and including in said phosphor mixture 0.01 to 0.30 mole of fluoride flux per mole of pyrosilicate; firing said mixture in a first firing and then admixing the product of said first firing with 0.5 to 12% by weight chloride flux and 0.5 to 10% by weight fluoride flux; firing the admixture and recovering a phosphor of said class M$_2$NSi$_2$O$_7$, said fluxes having at least one cation selected from the group consisting of alkaline earth metals, ammonia, magnesium, cadmium, zinc, aluminum and lead.

2. In the process of preparing phosphors of the class $M_2NSi_2O_7$ where M is at least one alkaline earth metal and N at least one member selected from the group consisting of magnesium, zinc and cadmium, the steps which comprise: mixing together ingredients necessary to form a phosphor of said class and including in said mixture 0.01 to 0.30 mole of fluoride flux per mole of pyrosilicate; firing said mixture in a first firing and then admixing the product thereof with 0.5 to 12% by weight chloride flux and 0.5 to 10% by weight fluoride flux, said fluoride flux of said first firing and said fluoride and chloride flux of said second firing having at least one cation selected from the group consisting of alkaline earth metals, ammonium, magnesium, cadmium, zinc, aluminum and lead; firing the admixture and recovering a phosphor of said class $M_2NSi_2O_7$.

References Cited by the Examiner
UNITED STATES PATENTS

| | | | |
|---|---|---|---|
| 2,542,322 | 2/51 | Froelich | 252—301.4 |
| 2,597,631 | 5/52 | Froelich | 252—301.4 |
| 2,807,587 | 9/57 | Butler et al. | 252—301.6 |
| 2,965,579 | 12/60 | Cox et al. | 252—301.6 |
| 2,975,143 | 3/61 | Hoekstra | 252—301.6 |

MAURICE A. BRINDISI, *Primary Examiner.*

JULIUS GREENWALD, *Examiner.*